(12) United States Patent
Kishiyama et al.

(10) Patent No.: US 8,331,347 B2
(45) Date of Patent: Dec. 11, 2012

(54) CELL SEARCH METHOD, MOBILE STATION, AND BASE STATION

(75) Inventors: Yoshihisa Kishiyama, Yokosuka (JP); Kenichi Higuchi, Yokohama (JP); Mamoru Sawahashi, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 763 days.

(21) Appl. No.: 12/447,887

(22) PCT Filed: Oct. 30, 2007

(86) PCT No.: PCT/JP2007/071123
§ 371 (c)(1),
(2), (4) Date: Jul. 2, 2009

(87) PCT Pub. No.: WO2008/053889
PCT Pub. Date: May 8, 2008

(65) Prior Publication Data
US 2010/0054184 A1    Mar. 4, 2010

(30) Foreign Application Priority Data
Nov. 1, 2006  (JP) .................................. 2006-298310

(51) Int. Cl.
*H04J 3/06*  (2006.01)
(52) U.S. Cl. ........ 370/350; 370/208; 370/329; 370/341; 370/510; 370/512
(58) Field of Classification Search .......... 370/328–332, 370/338, 341, 503, 509, 510, 512, 350
See application file for complete search history.

(56) References Cited

U.S. PATENT DOCUMENTS

| | | | |
|---|---|---|---|
| 7,969,964 B2 * | 6/2011 | Kim et al. ................. | 370/350 |
| 2003/0012270 A1 * | 1/2003 | Zhou et al. ................ | 375/150 |
| 2007/0041348 A1 * | 2/2007 | Kwun et al. .............. | 370/335 |
| 2007/0070944 A1 * | 3/2007 | Rinne et al. .............. | 370/329 |

OTHER PUBLICATIONS

International Search Report for PCT/JP2007/071123 mailed Dec. 25, 2007 (9 pages).
Written Opinion of ISA mailed Dec. 25, 2007 (3 pages).
3GPP TSG RAN WG1 Meeting #46; R1-062095 Tallinn, Estonia, Aug. 28-Sep. 1, 2006 Source: NTT DoCoMo et al. "Three-Step Cell Search Method for E-UTRA" (4 pages).
3GPP TSG RAN WG1 Meeting #46; R1-062093 Tallinn, Estonia, Aug. 28-Sep. 1, 2006 Source: NTT DoCoMo et al. "SCH Sequence Configuration for E-UTRA Downlink" (9 pages).

(Continued)

*Primary Examiner* — Christopher Grey
(74) *Attorney, Agent, or Firm* — Osha Liang LLP

(57) ABSTRACT

A cell search method performed by a mobile station for communication in an OFDM system includes a first step of detecting a timing and a carrier frequency of a primary synchronization channel based on correlation detection between a primary synchronization channel sequence and a received signal; a second step of determining a timing and a carrier frequency of a secondary synchronization channel based on the timing and the carrier frequency of the primary synchronization channel and detecting cell-specific control information including a frame timing and a cell ID group; and a third step of performing correlation detection on each cell ID in the cell ID group with a common pilot symbol on a common pilot channel and identifying a cell ID from the cell ID group.

12 Claims, 13 Drawing Sheets

OTHER PUBLICATIONS

3GPP TSG RAN WG1 LTE Adhoc; R1-061747 Cannes, France, Jun. 27-30, 2006 Source: Texas Instruments "Performance of Timing Acquisition and Cell Specific Info Detection in Tightly Synchronized Network for E-UTRA" (8 pages). IEICE Technical Report, vol. 107, No. 147 Shadan Hojin The Institute of Electronics, Information and Communication Engineers; Jul. 12, 2007 "OFDM Musen Access O Mochiiru EvolvedUTRA ni Okeru Doki Channel Keiretsu no Hyoka" Satoshi Nagata et al. pp. 119-124 (7 pages).

"W-CDMA Mobile Communication System" Keiji Tachikawa Published by Maruzen K.K., Mar. 15, 2002 pp. 35-36 (5 pages including English translation).

* cited by examiner

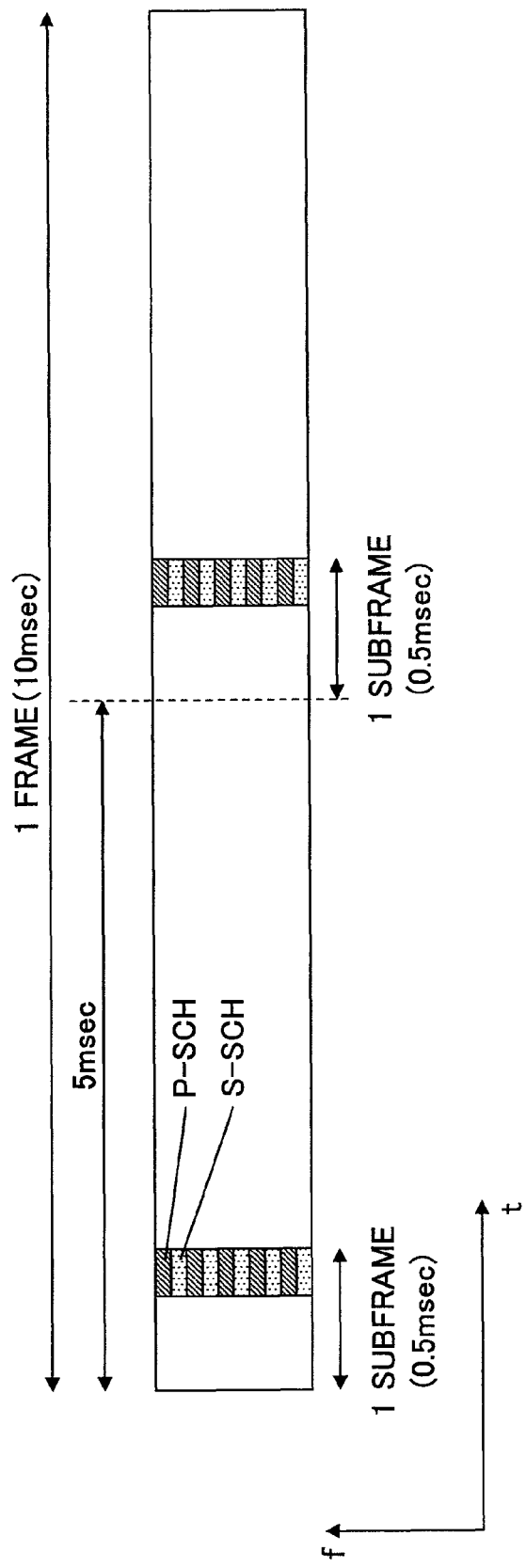

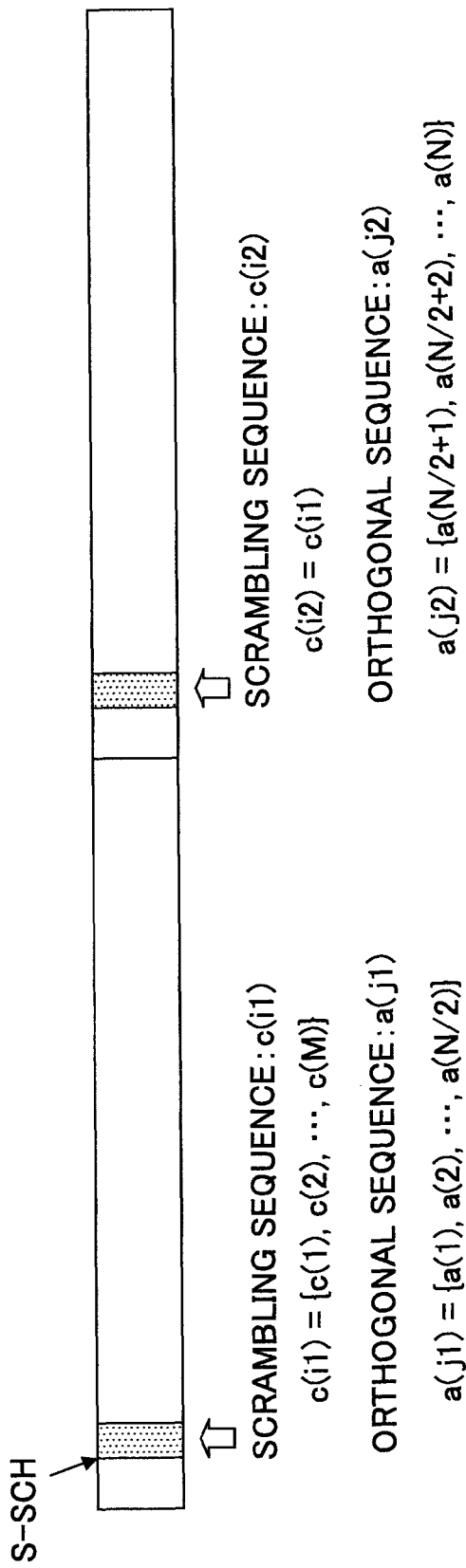

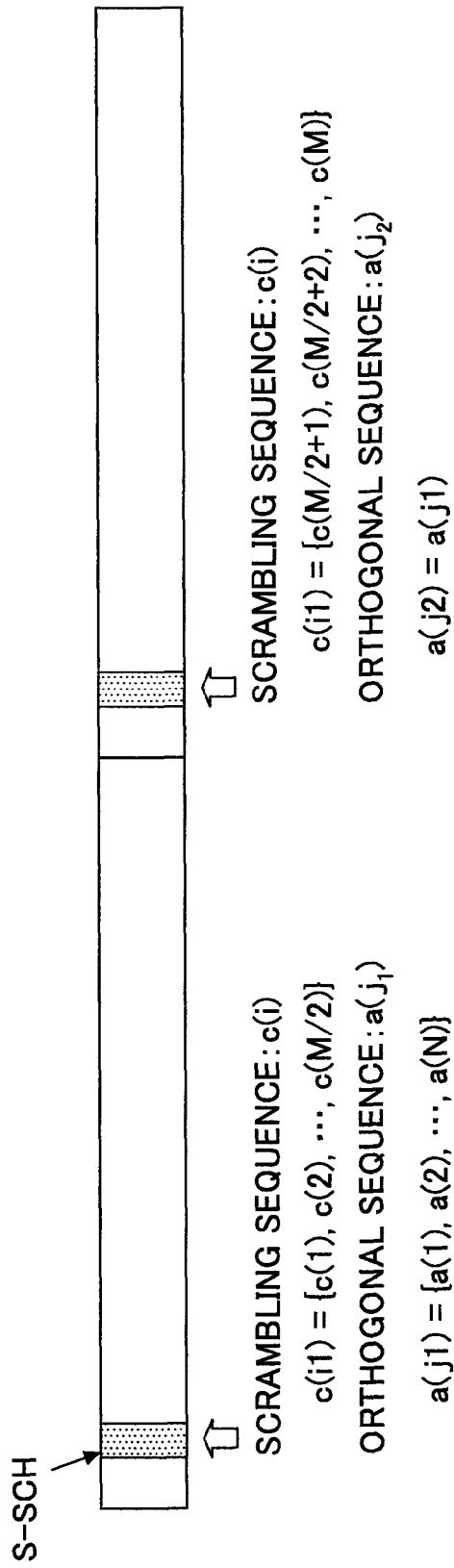

CELL SEARCH METHOD, MOBILE STATION, AND BASE STATION

TECHNICAL FIELD

The present invention relates to a cell search method, a mobile station, and a base station for communication in an OFDM (Orthogonal Frequency Division Multiplexing) system.

BACKGROUND ART

In a W-CDMA (Wideband Code Division Multiple Access) system, immediately after turning on the power, before entering soft handover, or during intermittent reception mode for standby, a mobile station needs to detect the cell with the smallest pass loss (the cell with the second smallest pass loss upon entering soft handover). This process is referred to as cell search, as it involves searching for cells required for establishing a radio link.

Typically, synchronization of spreading codes requires correlation detection at each timing accounting for the length (the number of chips) of every spreading code which needs to be searched, and then requires the detection of synchronization points. In the downlink, the number of scrambling codes is determined as a sufficiently large value, 512, to enable flexible scrambling code assignment. Accordingly, during initial cell search, the mobile station needs to sequentially perform the search on 512 types of scrambling codes, which is usually an extremely time-consuming process. With this in mind, a three-step cell search method has been proposed to enable fast cell search in an inter-BS (base station) asynchronous system (see "W-CDMA MOBILE COMMUNICATIONS SYSTEM" edited by Keiji Tachikawa, Japan, Mar. 15, 2002, pages 35-36).

DISCLOSURE OF INVENTION

Problem(s) to be Solved by the Invention

It is expected that an OFDM (Orthogonal Frequency Division Multiplexing) system will be used as a next-generation radio access system in the future. However, a fast cell search method is not defined in the OFDM system.

It is a general object of the present invention to achieve fast cell search in the OFDM system.

Means for Solving the Problem(s)

In one aspect of the present invention, there is provided a cell search method performed by a mobile station for communication in an OFDM (Orthogonal Frequency Division Multiplexing) system, including:

a first step of detecting a timing and a carrier frequency of a primary synchronization channel based on correlation detection between a primary synchronization channel sequence and a received signal;

a second step of determining a timing and a carrier frequency of a secondary synchronization channel based on the timing and the carrier frequency of the primary synchronization channel and detecting cell-specific control information including a frame timing and a cell ID group; and a third step of performing correlation detection on each cell ID in the cell ID group with a common pilot symbol on a common pilot channel and identifying a cell ID from the cell ID group.

In another aspect of the present invention, there is provided a mobile station for communication in an OFDM (Orthogonal Frequency Division Multiplexing) system, including:

a timing detecting unit configured to detect a timing and a carrier frequency of a primary synchronization channel based on correlation detection between a primary synchronization channel sequence and a received signal;

a frame timing and cell ID group detecting unit configured to determine a timing and a carrier frequency of a secondary synchronization channel based on the timing and the carrier frequency of the primary synchronization channel and detecting cell-specific control information including a frame timing and a cell ID group; and a cell ID identifying unit configured to perform correlation detection on each cell ID in the cell ID group with a common pilot symbol on a common pilot channel and identify a cell ID from the cell ID group.

In another aspect of the present invention, there is provided a base station for transmitting a primary synchronization channel sequence to a mobile station for communication in an OFDM system, including:

a primary synchronization channel sequence selecting unit configured to select the primary synchronization channel sequence from multiple synchronization channel sequences which is different from a primary synchronization channel sequence in an adjacent cell, wherein the primary synchronization channel sequence includes a lower layer code which is common to cells and an upper layer code which differs from one cell to another.

Advantageous Effect of the Invention

According to an embodiment of the present invention, fast cell search can be achieved in an OFDM system.

BRIEF DESCRIPTION OF THE DRAWINGS

FIG. 7C shows a third arrangement of a primary synchronization channel and a second synchronization channel.

FIG. 8A shows a first example of secondary synchronization channel sequences.

FIG. 8B shows a second example of secondary synchronization channel sequences.

DETAILED DESCRIPTION OF THE PREFERRED EMBODIMENTS

Description of Notations

- 10 base station
- 100 data channel generating unit
- 101 transmission data generating unit
- 103 encoding unit
- 105 data modulation unit
- 107 multiplexing unit
- 109 serial-to-parallel converting unit
- 111 scrambling code generating unit
- 113 combining unit
- 115 IFFT (Inverse Fast Fourier Transform) unit
- 117 CP adding unit
- 119 CP selecting unit
- 120 synchronization channel generating unit
- 121 data generating unit
- 122 primary synchronization channel (P-SCH) sequence selecting unit
- 123 data modulation unit
- 125 serial-to-parallel converting unit
- 20 mobile station
- 201 primary synchronization channel (P-SCH) correlation unit
- 203 timing detecting unit
- 205 FFT (Fast Fourier Transform) unit
- 207 demultiplexing unit
- 209 channel estimation unit
- 211 demodulation unit
- 213 secondary synchronization channel (S-SCH) correlation unit
- 215 frame timing and cell ID group detecting unit
- 217 FFT (Fast Fourier Transform) unit
- 219 demultiplexing unit
- 221 pilot correlation unit
- 223 cell ID identifying unit

BEST MODE OF CARRYING OUT THE INVENTION

With reference to the accompanying drawings, a description is given below with regard to preferred embodiments of the present invention.

[Cell Search Method in the Case where a Single Primary Synchronization Channel Sequence is Used]

Figure 1A:
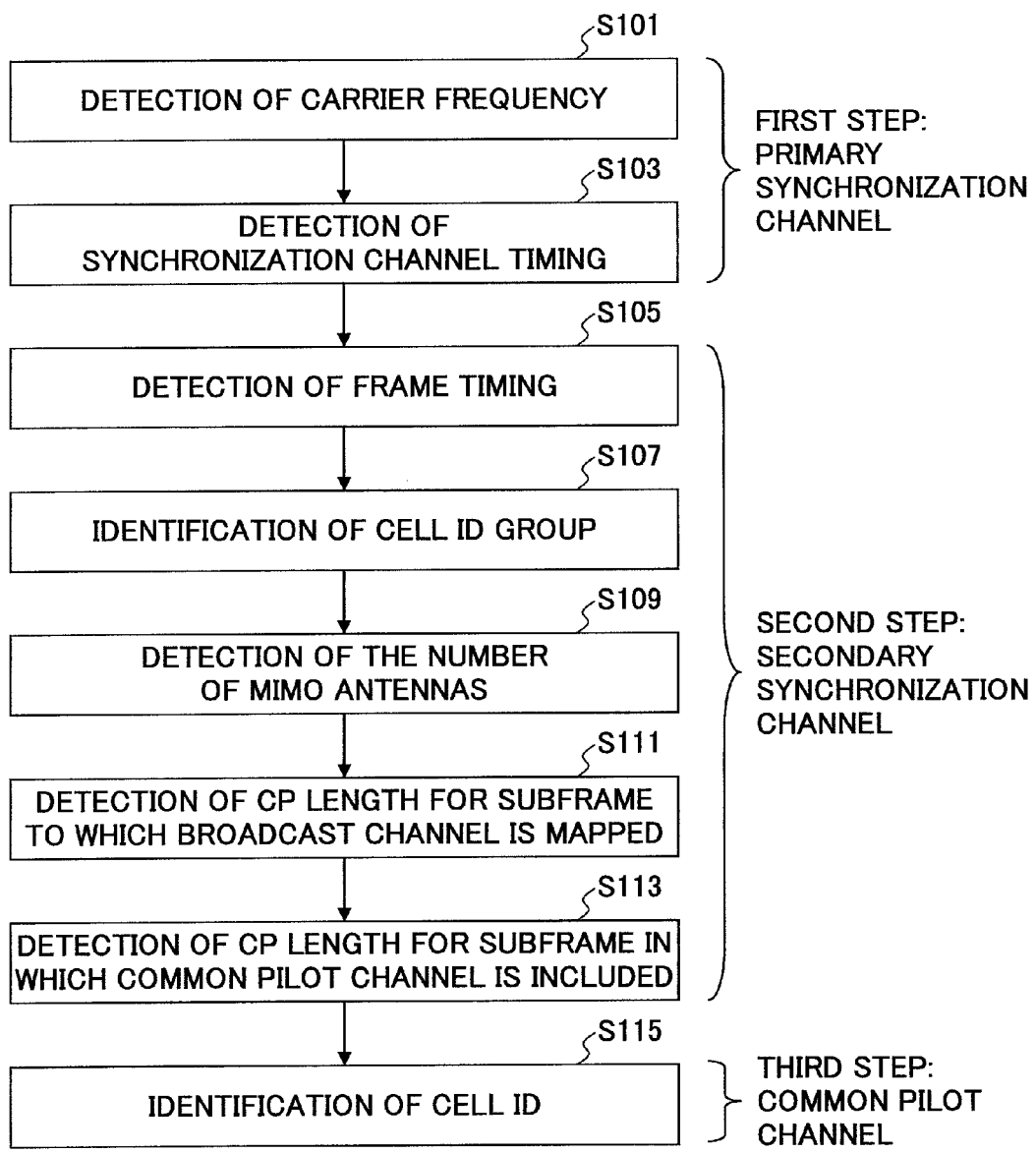
FIG. 1A shows a first flowchart of a cell search method in accordance with an embodiment of the present invention.
Figure 1B:
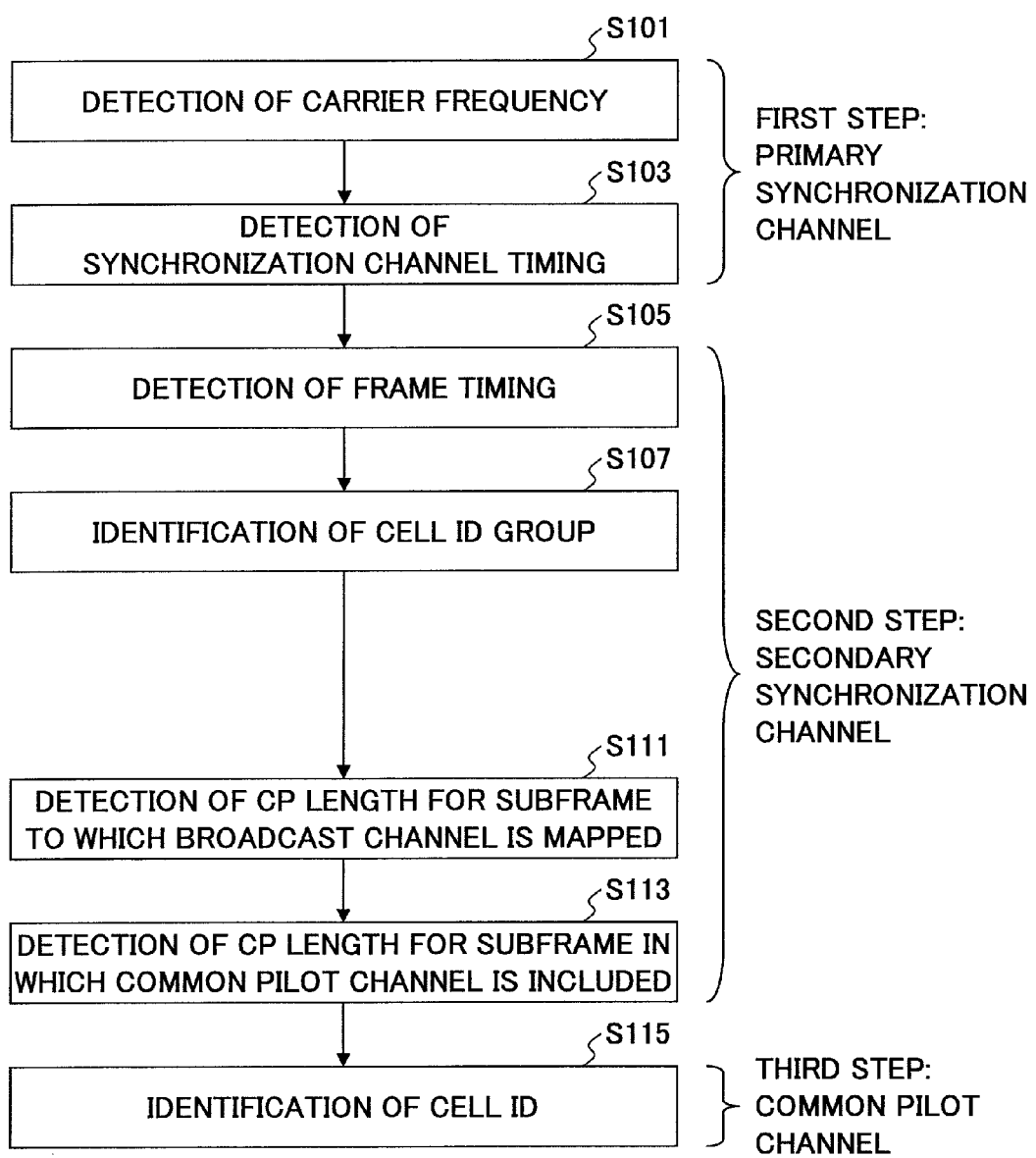
FIG. 1B shows a second flowchart of a cell search method in accordance with an embodiment of the present invention.
Figure 1C:
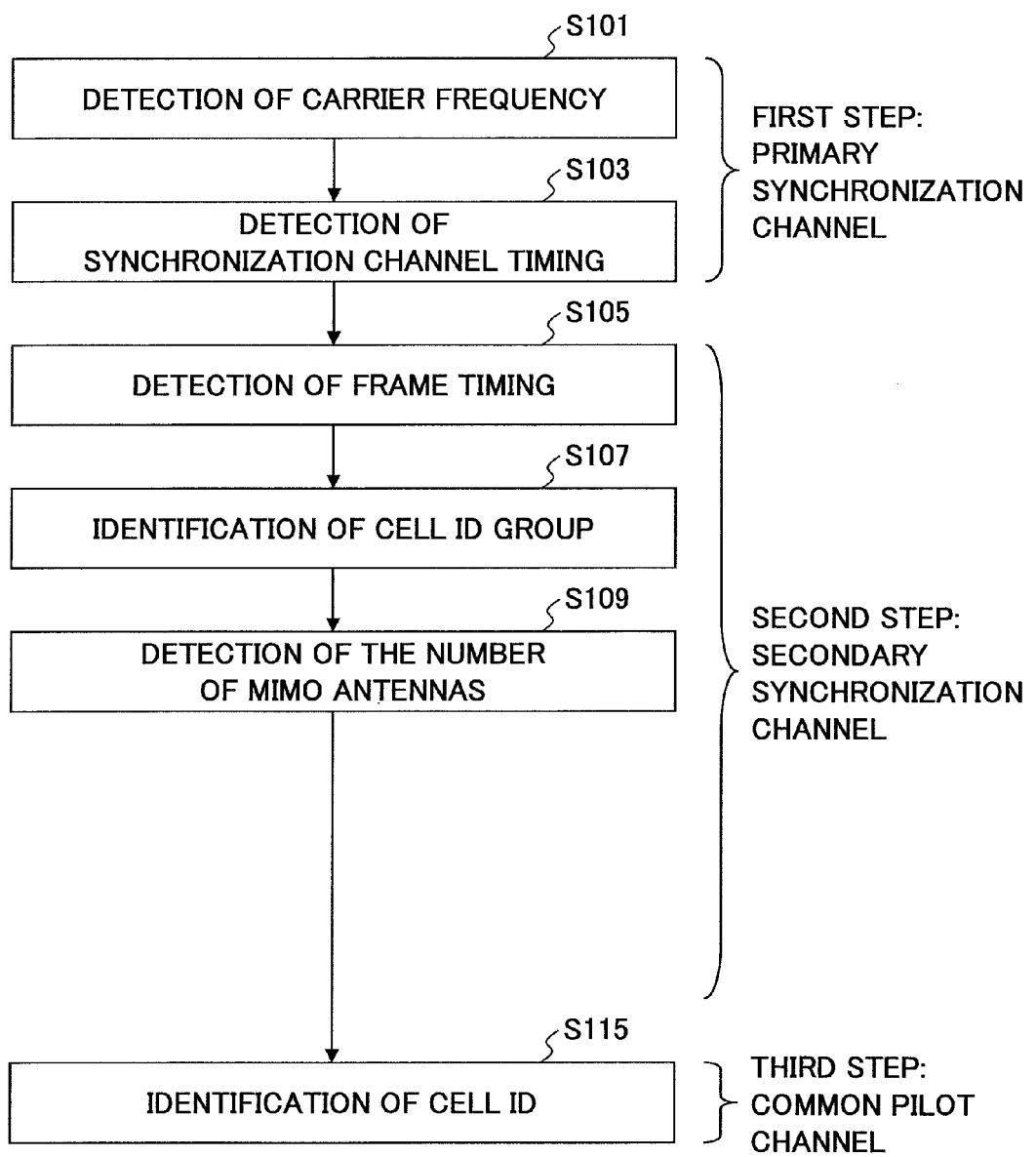
FIG. 1C shows a third flowchart of a cell search method in accordance with an embodiment of the present invention.

Typically, a single primary synchronization channel sequence is used for correlation detection with received signals during cell search. With reference to FIGS. 1A-1C, a fast cell search method with three-step processes is described below, in which detection of a frame timing is separated from identification of a cell ID.

FIG. 1A shows a flowchart of a cell search method in accordance with an embodiment of the present invention. In the first step, a mobile station performs correlation detection between a (single) primary synchronization channel sequence which is common to cells and received signals and detects a timing and a carrier frequency of a primary synchronization channel (S101, S103). In the first step, the mobile station may determine a phase difference among the signals and perform frequency offset compensation.

When the timing and the carrier frequency of the primary synchronization channel are known, a timing and a carrier frequency of a secondary synchronization channel are also known. The mobile station detects a frame timing based on a cell-specific secondary synchronization channel sequence used for the secondary synchronization channel (S105). Since multiple (for example, two) synchronization channels are placed in a single frame, it is necessary to detect the frame timing after timing detection. In addition, the mobile station identifies a cell ID group based on the cell-specific secondary synchronization channel sequence (S107). Provided that 512 types of cell IDs are used, correlation processing has to be performed 512 times in order to directly compute correlation of the synchronization channel, which increases the amount of correlation processing. Accordingly, 16 types of cell ID groups and 32 types of cell IDs for each cell ID group are defined, for example. In this case, correlation processing has only to be performed 16 times in the second step. Defining the cell ID group in this manner can reduce correlation processing or allow for the large number of cell IDs with the same amount of correlation processing.

When a base station includes multiple transmitting antennas, the base station notifies the mobile station of the number of transmitting antennas on the secondary synchronization channel. The mobile station may detect the number of transmitting antennas or MIMO (Multiple Input Multiple Output) antennas in the second step or the third step described below (S109). Specifically, the mobile station may detect the number of transmitting antennas used for the base station to transmit broadcast information on a broadcast channel. The following transmit diversity schemes are used on the broadcast channel.

1) STBC (Space Time Block Code)
2) SFBC (Space Frequency Block Code)
3) CDD (Cyclic Delay Diversity)

For the transmit diversity schemes 1) and 2), the mobile station has to know the number of transmitting antennas in advance. Accordingly, the mobile station detects the number of transmitting antennas in the second step or the third step.

In addition, the base station may notify, on the secondary synchronization channel, the mobile station of a CP (Cyclic Prefix) length for the subframe to which the broadcast channel is mapped, in order for the mobile station to receive broadcast information on the broadcast channel after cell search. The mobile station may detect the CP length for the broadcast channel in the second step or the third step (S111). Typically, two types of CP lengths (long CP and short CP) are used. If the mobile station detects the CP length as notified by the base station, the mobile station can improve the accuracy of the detection process on the broadcast channel. Provided that two types of CP lengths are used, the mobile station may perform two types of CP-related processes and select the suitable result. In this case, the mobile station need not detect the CP length for the broadcast channel during cell search.

Similarly, the base station may notify, on the secondary synchronization channel, the mobile station of a CP length for the subframe to which the common pilot channel is mapped. The mobile station may detect the CP length for the common pilot channel in the second step (S113). Since the common pilot channel is used to identify a cell ID in the third step, the mobile station can improve the accuracy of the identification process in the third step by detecting the CP length in the second step.

In the third step, the mobile station identifies a cell ID from the cell ID group which is identified in the second step. Specifically, the mobile station performs correlation detection on each cell ID in the cell ID group with a common pilot symbol (on the common pilot channel) and identifies the cell ID. In this third step, the mobile station identifies an orthogonal pilot sequence which is orthogonal to pilot sequences in other sectors and a scrambling code sequence used by the base station. Alternatively, the mobile station may identify only the orthogonal pilot sequence.

The three-step cell search method reduces correlation processing in the mobile station and allows for fast cell search. As shown in FIGS. 1B and 1C, some steps may be omitted.

[Structure of a Base Station]

Figure 2:
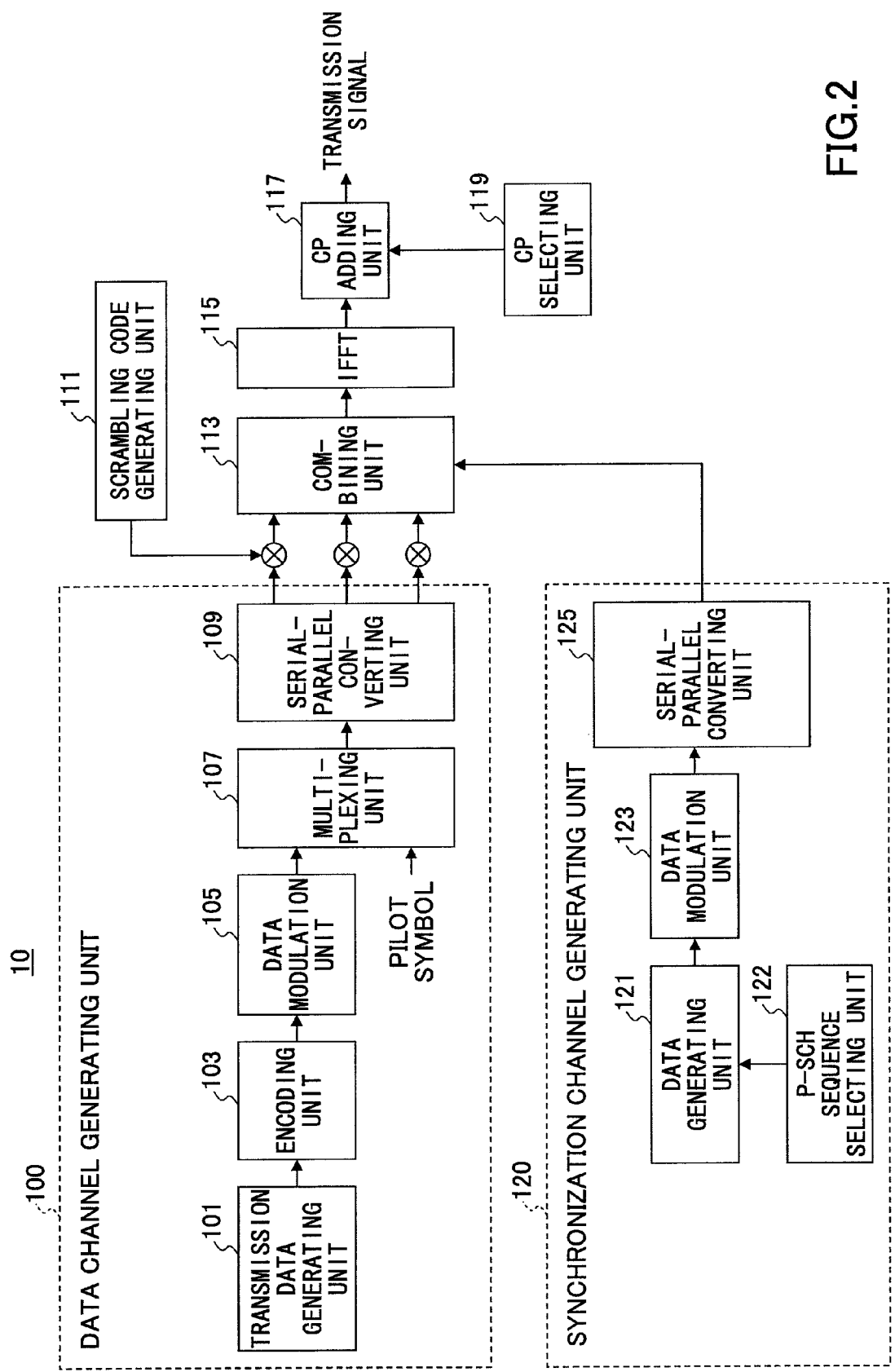
FIG. 2 shows a block diagram of a base station in accordance with an embodiment of the present invention.

FIG. 2 shows an example structure of a base station 10 for generating a synchronization channel used for three-step cell search in an OFDM system. The base station 10 transmits a synchronization signal on the synchronization channel. The mobile station uses the synchronization channel to perform cell search. The base station 10 includes a data channel generating unit 100 and a synchronization channel generating unit 120. In the data channel generating unit 100, a transmission data sequence supplied from a transmission data generating unit 101 is encoded in an encoding unit 103 and then modulated in a data modulation unit 105. In a multiplexing unit 107, a pilot symbol is multiplexed with the modulated data sequence. Then, in a serial-to-parallel converting unit 109, the resulting data sequence is serial-to-parallel converted into information symbol sequences on the frequency axis. It should be noted that the pilot symbol includes a cell ID.

The serial-to-parallel converted information symbol sequences are multiplied with a scrambling code supplied from a scrambling code generating unit 111 in the frequency direction, and the resulting symbol sequences are supplied to a combining unit 113. The combining unit 113 multiplexes the symbol sequences multiplied with the scrambling code and a synchronization signal generated by the synchronization channel generating unit 120. An inverse Fourier transform (IFFT) unit 115 transforms the symbol sequences into an orthogonal multicarrier signal. A CP (Cyclic Prefix) adding unit 117 inserts a CP selected by a CP selecting unit 119 into the multicarrier signal for each Fourier target time. As described above, the CP selecting unit 119 selects a long CP or a short CP, for example. Then, the base station 10 transmits the multicarrier signal supplied from the CP adding unit 117.

In the synchronization channel generating unit 120, a data generating unit 121 generates a primary synchronization channel sequence which is common to all the cells and a secondary synchronization channel sequence such as a frame timing or a cell ID group which is specific to the cell. Generating the primary synchronization channel and the secondary synchronization channel in this manner allows for the mobile station to detect the timing irrespective of the cell in which the mobile station is situated, by calculating correlation between the single primary synchronization channel sequence and received signals. As described below, a primary synchronization channel (P-SCH) sequence selecting unit 122 is included in the synchronization channel generating unit 120, when multiple primary synchronization channel sequences are used. When the base station 10 notifies the mobile station of control information such as the number of transmitting antennas (MIMO antennas), the CP length for the subframe to which the broadcast channel is mapped, or the CP length for the subframe in which the common pilot channel is included, the synchronization channel generating unit 120 may generate this control information as the secondary synchronization channel sequence. The synchronization channel sequence is data-modulated in a data modulation unit 123 and frequency-converted in a serial-to-parallel converting unit 125.

[Structure of a Mobile Station]

Figure 3:
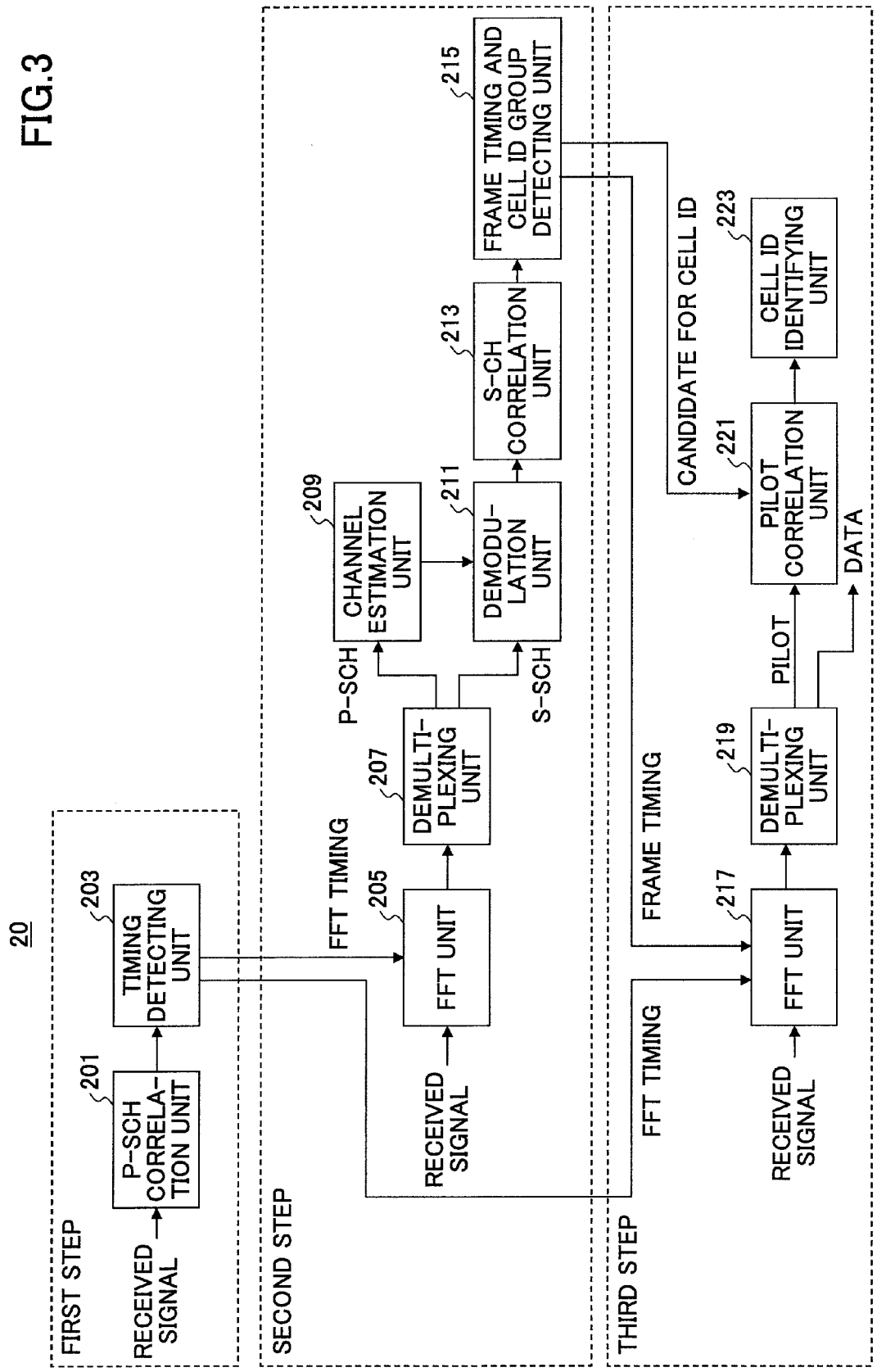
FIG. 3 shows a block diagram of a mobile station in accordance with an embodiment of the present invention.

FIG. 3 shows an example structure of a mobile station 20 for performing three-step cell search in an OFDM system.

The mobile station 20 performs three-step cell search. As the first step, the mobile station 20 includes a primary synchronization channel (P-SCH) correlation unit 201 and a timing detecting unit 203. As the second step, the mobile station 20 includes a Fourier transform (FFT) unit 205, a demultiplexing unit 207, a channel estimation unit 209, a demodulation unit 211, a secondary synchronization channel (S-SCH) correlation unit 213, and a frame timing and cell ID group detecting unit 215. As the third step, the mobile station 20 includes a Fourier transform (FFT) unit 217, a demultiplexing unit 219, a pilot correlation unit 221, and a cell ID identifying unit 223.

In the first step, the mobile station 20 detects a timing and a carrier frequency of the primary synchronization channel from the received signal. Specifically, the mobile station 20 supplies the multicarrier signal received by an antenna to the P-SCH correlation unit 201. The P-SCH correlation unit 201 performs correlation detection between a predetermined primary synchronization channel sequence and the received signal. The timing detecting unit 203 detects an FFT timing based on the correlation value and the timing derived from the correlation detection.

In the second step, the mobile station 20 detects cell-specific control information including a frame timing and a cell ID group on the secondary synchronization channel. Specifically, the received signal is processed by the FFT unit 205 using the FFT timing detected in the first step, and then supplied to the demultiplexing unit 207. The demultiplexing unit 207 separates the primary synchronization channel (P-SCH) signal and the secondary synchronization channel (S-SCH) signal from the multiplexed signal. The P-SCH signal is supplied to the channel estimation unit 209 and the S-SCH signal is supplied to the demodulation unit 211. The channel estimation unit 209 performs channel estimation and supplies the channel estimation result to the demodulation unit 211. The demodulation unit 211 performs demodulation and the secondary synchronization channel correlation unit 213 performs correlation. Based on the correlation result, the frame timing and cell ID group detecting unit 215 detects cell-specific control information including the frame timing and the cell ID group (candidates for a cell ID).

When the base station notifies, on the secondary synchronization channel, the mobile station of control information such as the number of transmitting antennas (MIMO antennas), the CP length for the subframe to which the broadcast channel is mapped, or the CP length for the subframe in which the common pilot channel is included, the frame timing and cell ID group detecting unit 215 may detect this control information.

In the third step, the mobile station 20 identifies a cell ID on the pilot channel. Specifically, the received signal is processed by the FFT unit 217 using the FFT timing detected in the first step and the frame timing detected in the second step, and then supplied to the demultiplexing unit 219. The demultiplexing unit 219 separates the pilot channel and the data channel from the multiplexed signal. The pilot correlation unit 211 performs correlation between each candidate for the cell ID in the cell ID group and the common pilot symbols on the common pilot channel. Based on the correlation result, the cell ID identifying unit 223 identifies the cell ID.

[Cell Search Method in the Case Where Multiple Primary Synchronization Channel Sequences are Used]

A cell search method is described below in the case where multiple primary synchronization channel sequences are used for correlation detection with received signals during cell search.

Since the W-CDMA system is an inter-cell asynchronous system, interference from adjacent cells during cell search is small, even if the same (single) primary synchronization channel sequence is used in every cell. In the OFDM system, it is possible to use a single primary synchronization channel sequence. Accurate detection is enabled with the use of replica correlation upon timing detection of the synchronization channel. When the single primary synchronization channel sequence is used, a mobile station has only to perform one type of replica correlation. Accordingly, the mobile station can reduce the amount of correlation processing.

On the other hand, an inter-cell synchronous system is under discussion for the OFDM system, in view of improving reception quality. In the inter-cell synchronous system, signals from adjacent cells may be received by the mobile station nearly simultaneously with signals from the own cell. In this case, the result of channel estimation is the combined result among multiple cells. Typically, accurate detection of the secondary synchronization channel is achieved by synchronous detection using the primary synchronization channel as a reference signal. In the inter-cell synchronous system, however, the accurate synchronous detection of the secondary synchronous channel may not be achieved in a certain cell.

In order to solve the aforementioned problem, multiple primary synchronization channel sequences are defined and different primary synchronization channel sequences are used in mutually adjacent cells.

Figure 4:
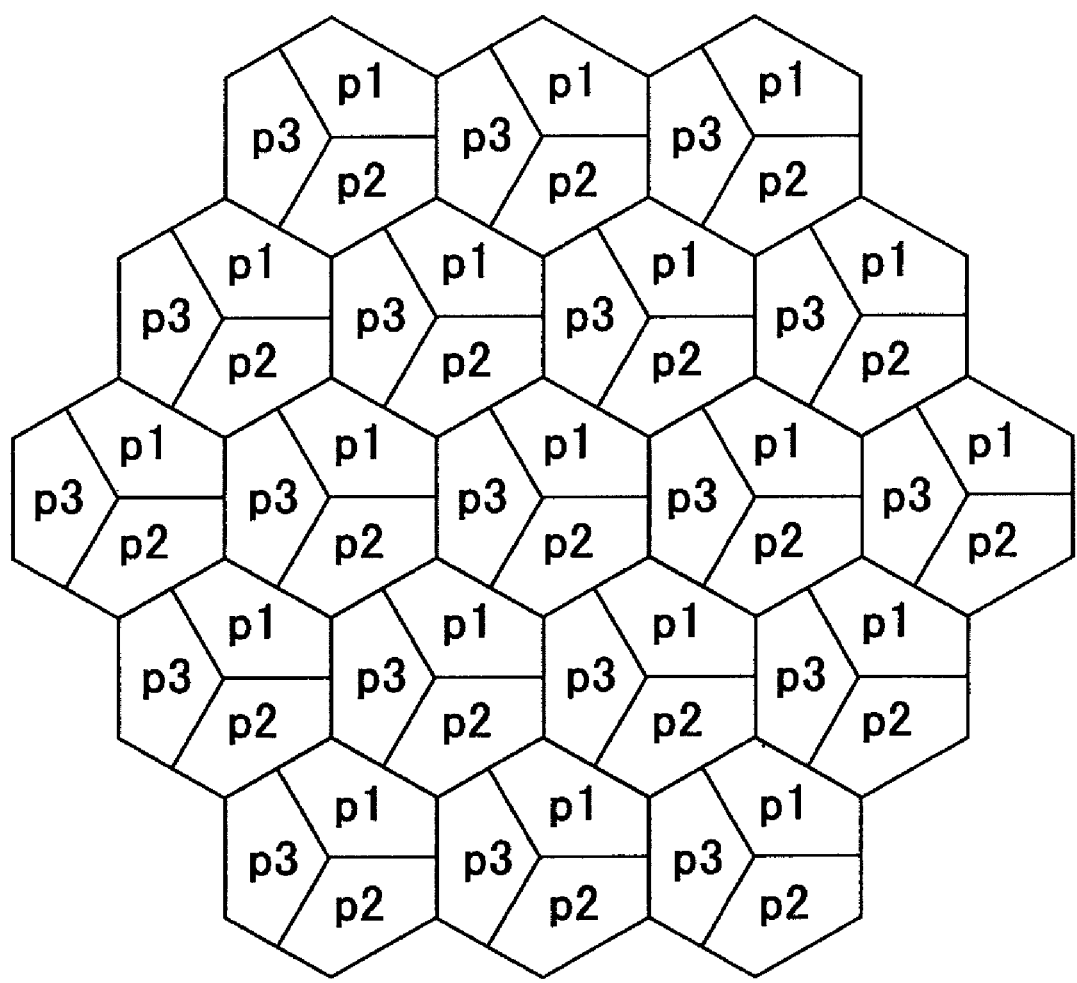
FIG. 4 shows an example of assigning multiple primary synchronization channel sequences to cells in a three-cell configuration.

FIG. 4 shows an example of assigning multiple primary synchronization channel sequences to cells in a three-cell (three-sector) configuration. In FIG. 4, three primary synchronization channel sequences (p1, p2, and p3), corresponding to the number of cells, are used and different primary synchronization channel sequences are assigned to mutually adjacent cells.

In order to assign different primary synchronization channel sequences to mutually adjacent cells, the primary synchronization channel sequence selecting unit 122 in the synchronization channel generating unit 120 of the base station 10 (FIG. 2) may select the primary synchronization channel sequences as shown in FIG. 4.

It should be noted that the P-SCH correlation unit 201 of the mobile station 20 needs to perform correlation processing, corresponding to the number of primary synchronization channel sequences, which complicates the correlation processing.

Figure 5:
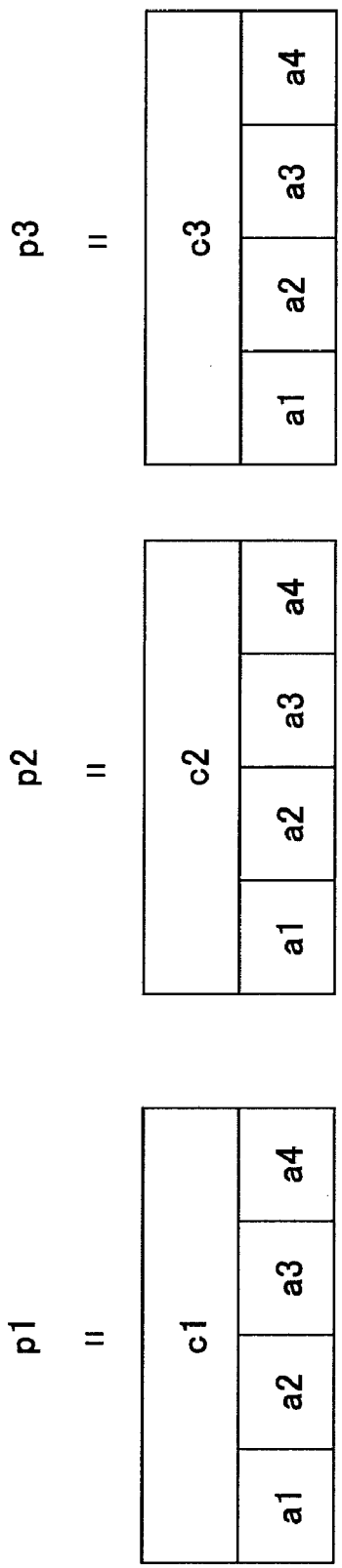
FIG. 5 shows two-layer codes used for primary synchronization channel sequences.

In order to reduce the correlation processing, a two-layer code including a lower layer code and an upper layer code is used for the primary synchronization channel sequence. FIG. 5 shows an example of the two-layer codes. The primary synchronization channel sequences (p1, p2, p3) are generated by the combination of a set of lower layer codes (a1, a2, a3, a4) which is common to cells and a set of upper layer codes (c1, c2, c3) which differs from one cell to another. Using the two-layer codes, the mobile station can perform correlation processing by means of the common set of lower layer codes, thereby reducing correlation processing.

Figure 6:
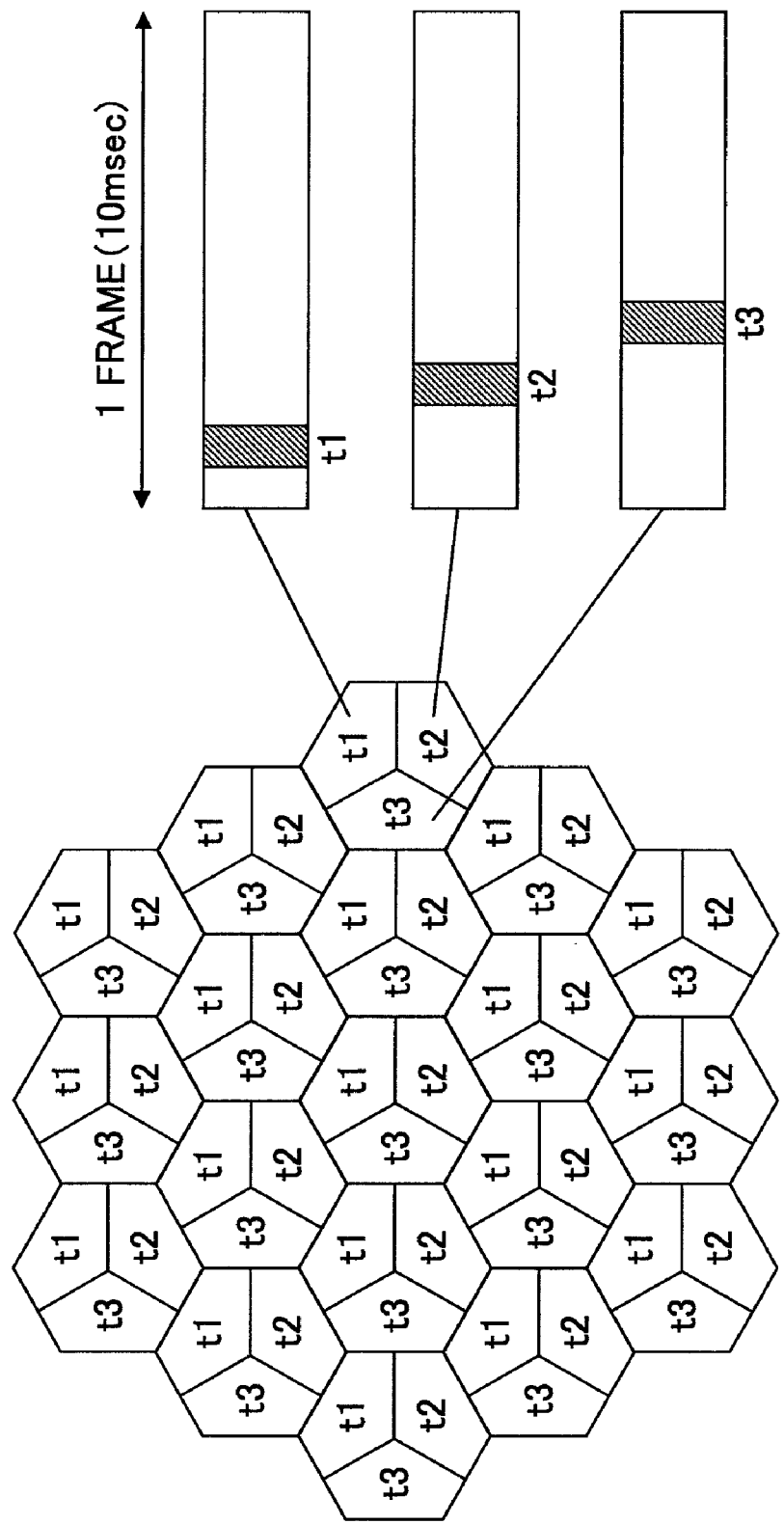
FIG. 6 shows an example of assigning a primary synchronization channel sequence at different timings to cells in a three-cell configuration.

An embodiment of shifting the timing of transmitting the primary synchronization channel sequence within a frame with the use of a common primary synchronization channel sequence can produce the same effect as the embodiment of assigning different primary synchronization channel sequences to mutually adjacent cells. FIG. 6 shows an example of assigning a common primary synchronization channel sequence at different timings. The base station transmits a primary synchronization channel sequence p1 at a timing t1 in a cell 1, transmits the primary synchronization channel sequence p1 at a timing t2 in a cell 2, and transmits the primary synchronization channel sequence p1 at a timing t3 in a cell 3. By assigning the primary synchronization channel sequence so as not to overlap timings among mutually adjacent cells, interference from the adjacent cells during synchronous detection can be reduced. It is also possible to combine the embodiment of using multiple primary synchronization channel sequences (FIG. 4) and the embodiment of shifting the timing of transmitting the primary synchronization channel sequence (FIG. 6).

[Arrangement of a Synchronization Channel]

Figure 7A:
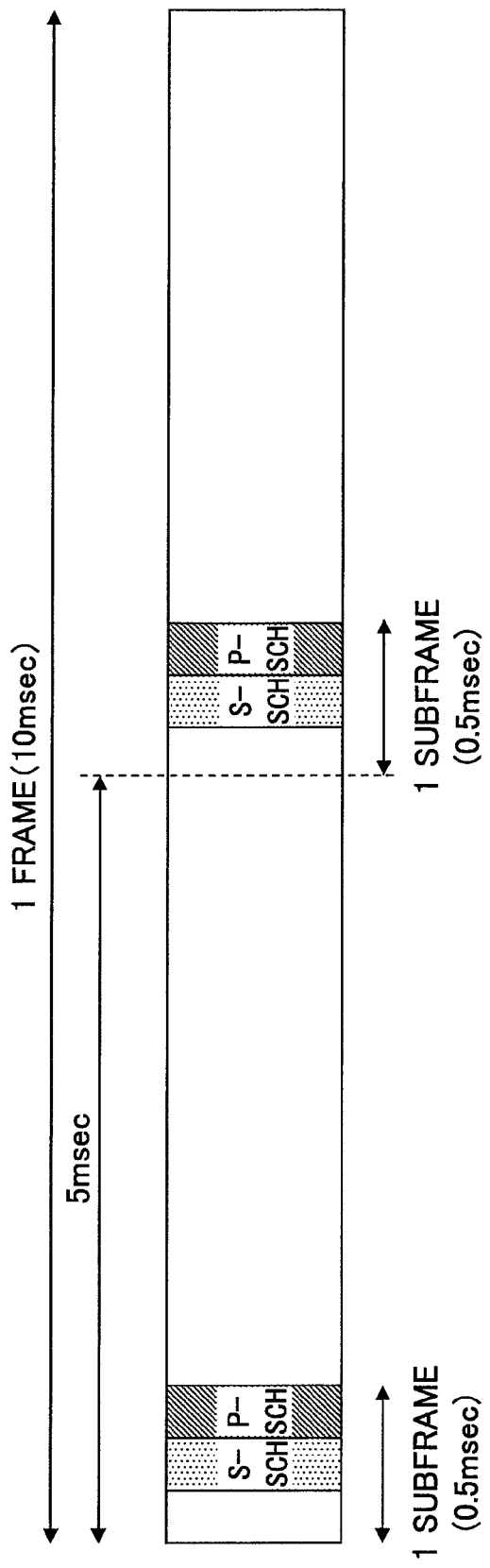
FIG. 7A shows a first arrangement of a primary synchronization channel and a second synchronization channel.
Figure 7B:
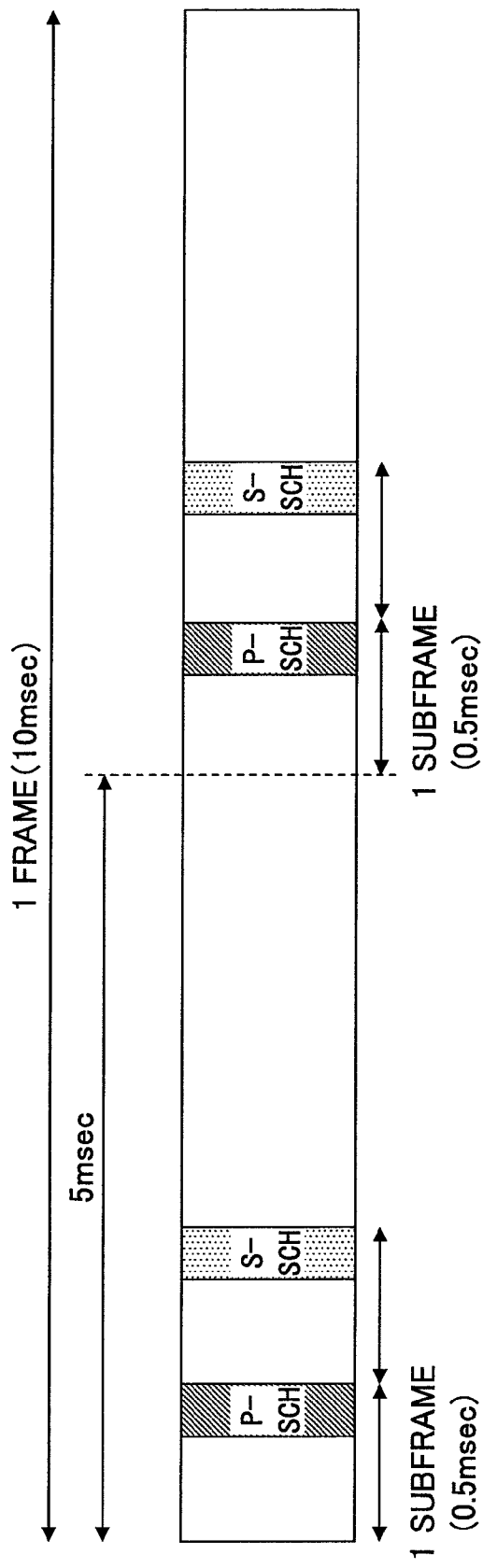
FIG. 7B shows a second arrangement of a primary synchronization channel and a second synchronization channel.

Example arrangements of a synchronization channel are described below. As described above, accurate detection of the secondary synchronization channel is achieved by synchronous detection using the primary synchronization channel as a reference signal. Accordingly, it is necessary to map (allocate) the primary synchronization channel and the secondary synchronization channel to a radio frame with a predetermined pattern. FIGS. 7A-7C show arrangements of two synchronization channels mapped to a single frame.

FIG. 7A shows an arrangement where the primary synchronization channel and the secondary synchronization channel are adjacently placed in the first subframe and the center subframe. By adjacently placing the primary synchronization channel and the secondary synchronization channel in this manner, the time-varying effect of channel estimation using the primary synchronization channel can be reduced.

FIG. 7B shows an arrangement where the primary synchronization channel is placed at the end of the first subframe and the end of the center subframe and the secondary synchronization channel is placed in the next subframe. As described above, two types of CP lengths are used. When the primary synchronization channel and the secondary synchronization channel are adjacently placed as shown in FIG. 7A, the position of the secondary synchronization channel may vary depending on the CP length for the primary synchronization channel. For example, when the long CP is used for the primary synchronization channel, the range occupied by the primary synchronization channel becomes large and the position of the secondary synchronization channel moves forward. By placing each of the primary synchronization channel and the secondary synchronization channel at the end of the adjacent subframes, detection processing independent of the CP length is enabled.

FIG. 7C shows an arrangement where the primary synchronization channel and the secondary synchronization channel are frequency-multiplexed and placed at the end of the first subframe and the end of the center subframe. By placing the synchronization channels in this manner, overhead for the synchronization channel can be reduced.

Code sequences used for the secondary synchronization channels are described below. As described above, multiple secondary synchronization channels may be mapped to (placed in) a single frame. In order to achieve fast cell search, it is desirable to process one of the secondary synchronization channels to detect a cell ID group and a frame timing.

FIGS. 8A and 8B show two secondary synchronization channel sequences mapped to a single frame, each of which includes an orthogonal sequence and a scrambling sequence.

In FIG. 8A, any one of M scrambling sequences and any one of N orthogonal sequences are used for the first secondary synchronization channel sequence. The same scrambling sequence and an orthogonal sequence corresponding to that of the first secondary synchronization channel sequence are used for the second secondary synchronization channel sequence. For example, it is determined in advance that when an orthogonal sequence $a(j1)=a(1)$ is used for the first secondary synchronization channel sequence, an orthogonal sequence $a(j2)=a(N/2+1)$ is used for the second secondary synchronization channel sequence. Similarly, when an orthogonal sequence $a(j1)=a(2)$ is used for the first sequence, an orthogonal sequence a(j2)=a(N/2+2) is used for the second sequence. According to these sequences, a mobile station need not process another secondary synchronization channel after processing one secondary synchronization channel. In addition, the mobile station can receive control information on the secondary synchronization channel in a shorter time and achieve faster neighboring cell search for the purpose of handover.

Similarly, in FIG. 8B, any one of M scrambling sequences and any one of N orthogonal sequences are used for the first secondary synchronization channel sequence. A scrambling sequence corresponding to that of the first secondary synchronization channel sequence and the same orthogonal sequence are used for the second secondary synchronization channel sequence. According to these sequences, a mobile station need not process another secondary synchronization channel after processing one secondary synchronization channel.

Alternatively, a relationship between one set of scrambling code sequence and orthogonal sequence and another set may be determined in advance. The mobile station may determine the sequence for the second secondary synchronization channel corresponding to the sequence for the first secondary synchronization channel based on the relationship.

Although two secondary synchronization channel sequences are used in FIGS. 8A and 8B, a single secondary synchronization channel sequence may be used in a similar manner. When each code for the single synchronization channel sequence has a predetermined relationship, a mobile station need not process another secondary synchronization channel after processing one secondary synchronization channel As described above, according to an embodiment of the present invention, fast cell search can be achieved in the OFDM system.

This international patent application is based on Japanese Priority Application No. 2006-298310 filed on Nov. 1, 2006, the entire contents of which are incorporated herein by reference.

The invention claimed is:

1. A cell search method performed by a mobile station for communication in an OFDM (Orthogonal Frequency Division Multiplexing) system, comprising:
    a first step of detecting a timing and a carrier frequency of a primary synchronization channel by detecting an upper layer code based on correlation detection between a lower layer code and a received signal, wherein plural primary synchronization channel sequences including the lower layer code which is common to cells and the upper layer code which differs from one cell to another are used;
    a second step of determining a timing and a carrier frequency of a secondary synchronization channel based on the timing and the carrier frequency of the primary synchronization channel and detecting cell-specific control information including a frame timing and a cell ID group; and
    a third step of performing correlation detection on each cell ID in the cell ID group with a common pilot symbol on a common pilot channel and identifying a cell ID from the cell ID group.

2. The cell search method as claimed in claim 1, further comprising the step of:
    detecting the number of transmitting antennas, when a base station includes multiple transmitting antennas.

3. The cell search method as claimed in claim 1, further comprising the step of:
    detecting the number of transmitting antennas used for a broadcast channel, when a base station includes multiple transmitting antennas.

4. The cell search method as claimed in claim 1, further comprising the step of:
    detecting a CP (Cyclic Prefix) length for a subframe to which a broadcast channel is mapped.

5. The cell search method as claimed in claim 1, wherein:
    the second step further comprises the step of detecting a CP length for a subframe in which the common pilot channel used in the third step is included.

6. The cell search method as claimed in claim 1, wherein:
    the third step comprises identifying an orthogonal pilot sequence which is orthogonal to pilot sequences in other sectors.

7. The cell search method as claimed in claim 1, wherein:
    the third step comprises identifying both an orthogonal pilot sequence which is orthogonal to pilot sequences in other sectors and a scrambling code sequence used by a base station.

8. The cell search method as claimed in claim 1, wherein:
    in the case where multiple secondary synchronization channels are mapped to a radio frame and sequences for the secondary synchronization channels respectively have a predetermined relationship,
    the second step comprises detecting the cell-specific control information including the frame timing and the cell ID group from one of the multiple secondary synchronization channels.

9. The cell search method as claimed in claim 1, wherein:
    in the case where multiple secondary synchronization channels are mapped to a radio frame, each sequence for the secondary synchronization channels includes an orthogonal sequence and a scrambling sequence, and the orthogonal sequence and the scrambling sequence have a predetermined relationship,
    the second step comprises detecting the cell-specific control information including the frame timing and the cell ID group from one of the multiple secondary synchronization channel.

10. The cell search method as claimed in claim 9, wherein:
    the predetermined relationship between the orthogonal sequence and the scrambling sequence is defined in such a manner that
    when the scrambling sequence and the orthogonal sequence for one of the multiple secondary synchronization channels are defined as $c(i1)=\{c(1), c(2), \ldots, c(M)\}$ and $a(j1)=\{a(1), a(2), \ldots, a(N/2)\}$, respectively, the scrambling sequence and the orthogonal sequence for another of the multiple secondary synchronization channels are defined as $c(i2)=c(i1)$ and $a(j2)=\{a(N/2+1), a(N/2+2), \ldots, a(N)\}$, respectively.

11. The cell search method as claimed in claim 9, wherein:
    the predetermined relationship between the orthogonal sequence and the scrambling sequence is defined in such a manner that
    when the scrambling sequence and the orthogonal sequence for one of the multiple secondary synchronization channels are defined as $c(i1)=\{c(1), c(2), \ldots, c(M/2)\}$ and $a(j1)=\{a(1), a(2), \ldots, a(N)\}$, respectively, the scrambling sequence and the orthogonal sequence for another of the multiple secondary synchronization channels are defined as $c(i2)=\{c(M/2+1), c(M/2+2), \ldots, C(M)\}$ and $a(j2)=a(j1)$, respectively.

12. A mobile station for communication in an OFDM (Orthogonal Frequency Division Multiplexing) system, comprising:

a timing detecting unit configured to detect a timing and a carrier frequency of a primary synchronization channel by detecting an upper layer code based on correlation detection between a lower layer code and a received signal, wherein plural primary synchronization channel sequences including the lower layer code which is common to cells and the upper layer code which differs from one cell to another are used;

a frame timing and cell ID group detecting unit configured to determine a timing and a carrier frequency of a secondary synchronization channel based on the timing and the carrier frequency of the primary synchronization channel and detecting cell-specific control information including a frame timing and a cell ID group; and a cell ID identifying unit configured to perform correlation detection on each cell ID in the cell ID group with a common pilot symbol on a common pilot channel and identify a cell ID from the cell ID group.

* * * * *